United States Patent [19]

Smallidge

[11] Patent Number: 5,031,329
[45] Date of Patent: Jul. 16, 1991

[54] DIGITAL LEVEL WITH PLUMB

[76] Inventor: Bernard W. Smallidge, 3065 Connecticut Ave., Burton, Mich. 48519

[21] Appl. No.: 479,929

[22] Filed: Feb. 14, 1990

[51] Int. Cl.⁵ .............................................. G01C 9/06
[52] U.S. Cl. ...................................... 33/366; 33/382
[58] Field of Search ................. 33/366, 363 K, 363 L, 33/363 N, 347, 355 R; 324/691, 693, 699, 705, 713, 715

[56]  References Cited

U.S. PATENT DOCUMENTS

| | | | |
|---|---|---|---|
| 2,155,865 | 4/1939 | Leavenworth et al. | 33/366 |
| 3,114,209 | 12/1963 | Foody et al. | 33/366 |
| 3,487,303 | 12/1969 | Remington | 33/366 |
| 4,079,521 | 3/1978 | Uhorczak | 33/366 |
| 4,182,046 | 1/1980 | Ludlow et al. | 33/366 |
| 4,506,450 | 3/1985 | Fleming et al. | 33/366 |
| 4,514,727 | 4/1985 | Van Antwerp | 250/214 AL |
| 4,563,822 | 1/1986 | Legris | 33/367 |
| 4,567,666 | 2/1986 | Neis et al. | 33/366 |
| 4,590,680 | 5/1986 | Hanchett et al. | 33/366 |
| 4,592,147 | 6/1986 | Herman | 33/366 |
| 4,654,977 | 4/1987 | Pakus | 33/366 |
| 4,668,846 | 5/1987 | Klumpp | 200/61.45 R |
| 4,720,920 | 1/1988 | Tudek | 33/366 |
| 4,825,143 | 4/1989 | Cheny | 364/707 |
| 4,878,297 | 11/1989 | Vories | 33/366 |
| 4,912,662 | 3/1990 | Butler et al. | 33/366 |

FOREIGN PATENT DOCUMENTS 2158230 11/1985 United Kingdom ................. 33/366

OTHER PUBLICATIONS

*Popular Science*, May 1989.

*Primary Examiner*—Thomas B. Will
*Attorney, Agent, or Firm*—Dykema Gossett

[57]  ABSTRACT

An electronically operated level apparatus and method to allow the slope of a surface to be easily measured. The apparatus includes a hermetically sealed bladder partially filled with an electrically conductive liquid and partially filled with a gas. The electrically conductive liquid is free to align itself within the bladder in response to the incline of a surface. Current probes placed within the hermetically sealed bladder measure the electrical resistance of the electrically conductive liquid, and electronic circuitry converts this measured resistance into an electrical signal having an amplitude proportional to slope. Electronic circuitry is included to minimize the current drawn from the electronic components while the level is not in use. Other electronic circuitry prevents the level from operating when it is placed in an orientation which is inconsistent with its ability to sense slope.

2 Claims, 3 Drawing Sheets

5,031,329

DIGITAL LEVEL WITH PLUMB

TECHNICAL FIELD

The present invention generally relates to devices which indicate the slope of a surface, and deals more specifically with electronically operated levels used predominantly in carpentry, masonry and plumbing work.

BACKGROUND OF THE INVENTION

Devices which are used to indicate the slope of a surface are generally known as levels and are used by various skilled tradesman, particularly those skilled in the construction field. For example, a rough carpenter often needs to know if a wall is perfectly vertical or "plumb." A mason, after laying a course of bricks, needs to know if the newly laid course is horizontal. A plumber often needs to install drainage pipe with a certain prescribed slope so that the contents of the pipe will drain properly. These are all applications in which a skilled tradesman would typically employ the use of a level.

Numerous types of level devices have been available for years. These devices have typically employed as their slope sensor, a hermetically sealed, clear glass tube filled partially with a liquid and partially with a gas. The tube is constructed with a slight arc in its midsection so that when it is properly oriented, the gas contained inside of it will rise to the highest portion of the arched section. This tube is fixed to a member having at least one substantially straight edge, and the face if the tube is indexed so that the gas bubble is centered in the indices when the straight edge of the member lies in a substantially horizontal or vertical plane.

Although the above-mentioned level, typically known as a bubble level or spirit level, has been used for may years, it is not without its drawbacks. For example, it cannot be used in situations where the ambient light is insufficient to allow the operator to view the liquid-filled tube. Another disadvantage of the bubble level is that it typically cannot be used to accurately measure inclines which are not perfectly horizontal or vertical. A number of improvements to the traditional bubble level have been introduced recently in an attempt to overcome its inherent problems. Most of these improvements concentrate in the area of improving the sensor used to sense incline and the use of electronics to condition and present slope information.

One such device which uses electronics to aid in the measurement of sloped surfaces is disclosed in U.S. Pat. No. 4,592,147 issued to Herman on June 3, 1986. This patent uses a pendulum immersed in an oscillation damping liquid as the fundamental sensor for measuring slope. The pendulum is suspended within a light path, thereby causing an electrical output indicating when the pendulum is in a predetermined position. This predetermined condition can be calibrated to represent a vertical, horizontal or any predetermined position. This patent abandons the use of a bubble-filled tube as the fundamental sensor of slope. The device disclosed in Herman suffers from one of the same drawbacks as that of the traditional bubble level inasmuch as it cannot measure graduations of slope such as 1 degree, 2 degrees, etc. Further, the pendulum sensor only has the capability of sensing a single orientation. For example, if the device disclosed in Herman is to be used to measure both a 0 degree slope and a 90 degree slope, two separate sensors would have to be incorporated in the indicating device; one sensor would be used for vertical measurement, and the other would be used for horizontal measurement.

Another level detecting device which employs a device similar to a pendulum as the fundamental sensor of slope is disclosed in U.S. Pat. No. 4,668,846 issued to Klumpp on May 26, 1987. This device is similar to that disclosed in Herman in that it does not use a bubble level for sensing slope. Klumpp teaches a gravity-sensing rotor which has various electrical contacts disposed on the rotor. When the rotor is oriented in certain preselected positions, the electrical contacts provide a current path, thereby switching current to various information output terminals. Klumpp does not teach the use of a chamber, partially filled with liquid, as the fundamental means for detecting surface slope. The device disclosed in Klumpp must be externally illuminated whenever the ambient light conditions are insufficient for viewing.

U.S. Pat. No. 4,563,822 issued to Legris on Jan. 14, 1986 discloses a level device for masonry work which uses a combination of a flexible tube filled with a liquid, a plurality of chambers and diaphragms and needle-type contacts which indicate a point which may be higher or lower than a predetermined level. This device cannot be used to measure vertical slopes in that it is only sensitive to differences in height.

Other level detecting devices of the type which use electronics are disclosed in the May 1989 issue of *Popular Science*. One such level marketed by Wedge Innovations termed the SmartLevel TM uses an advanced digital electronic circuit consisting of a patented microcalculator and gravity-leveling sensor housed in a tough, polycarbonate module. Further details on the gravity-leveling sensor are not disclosed in the *Popular Science* article. Another level disclosed in the May 1989 issue of *Popular Science* is one marketed by Zircon International and is called the Anglesensor TM. The Anglesensor is built around an optically-sensed pendulum. The pendulum swings in one plane and bisects a path of infrared light. The Anglesensor does not use a cylinder partially filled with a liquid for sensing slope.

Accordingly, it is a primary object of the present invention to provide an electronic level for sensing the incline of a surface.

A further object of this invention is to provide an electronic level which indicates the incline of a surface in calibrated graduations.

Still another object of this invention is to provide a device which indicates the amount of incline of a surface by monitoring the electrical resistivity of an electrically conductive fluid.

Still another object of this invention is to provide an electronic level which is self-illuminating and provides for an automatic brightness control as a function of ambient light conditions.

Still a further object of the present invention is to provide an electronic level which detects horizontal and vertical slopes.

Yet another object of the invention is to provide an electronic level having a standby mode for conserving battery power.

Yet another object of the invention is to provide a digital level having an error display circuit for indicating when the level is oriented in a position which is inconsistent with its ability to detect the slope of a surface.

SUMMARY OF THE INVENTION

Accordingly, the present invention provides an electronically operated level for measuring the incline of a surface which includes means partially filled with an electrically conductive liquid for sensing the incline of a surface wherein the liquid is free to align itself within the sensing means in relation to the incline. First and second probe means are couple to the sensing means for directing an electric current through the electrically conductive liquid. The present invention discloses means for measuring the electrical resistance of the electronically conductive liquid between the first and second probe means wherein the electrical resistance of the liquid between the first and second probe means is related to the incline of the surface. Coupled to the measuring means is a means for indicating the incline of the surface such as a self-illuminating indicator.

The sensing means includes a first and second sensing means. The first sensing means is used to sense the incline of a surface which is generally horizontal and the second sensing means is used to sense the incline of a surface which is generally vertical. The sensing means also includes an automatic switch means for enabling the first sensing means when the level is generally horizontal and for enabling the second sensing means when the level is generally vertical. The indicating means also includes a light-emitting means for visually indicating the incline of a surface and means for automatically raising and lowering the intensity of the light-emitting means as a function of the ambient light surrounding the level.

The measuring means further includes a driver circuit means, null detector circuit means and time-out circuit means, wherein said time-out circuit means substantially reduces the electrical power consumed by the driver circuit means and the null detector circuit means after the expiration of a predetermined time period. This reduces the power drawn from the DC power source when the level is not in use or is inadvertently left on. The measuring means preferably includes an error-indicating circuit means to indicate when the level is not generally in a horizontal or vertical orientation.

The light means preferably includes a first and second light means, where the first light means is activated by the automatic switch means for indicating the incline of the surface when the surface is generally horizontal, and the second light means is activated by the automatic switch means for indicating the incline of a surface when the surface is generally vertical.

The sensing means preferably includes a hermetically sealed bladder partially filled with an electrically conductive liquid and partially filled with a gas. The bladder has one raised portion where the air tends to collect and one lower portion where the liquid tends to settle. The first and second probe means preferably protrude through the hermetically sealed bladder, and in one orientation of the bladder, the first probe only contacts the liquid, and the second probe only contacts the gas. The second probe is preferably oriented so that the portion of the second probe which contacts only gas in one orientation of the bladder is increasingly contacted by the liquid as the bladder is rotated on at least one axis.

According to a second aspect of the present invention, there is provided a method of quantifying the incline of a surface by using a level having a hermetically sealed chamber partially filled with an electrically conductive liquid and partially filled with a gas, the liquid being in contact with a first current probe and the gas being in contact with a second current probe. The method comprises the steps of: (A) placing the level against the incline of the surface; (B) measuring the electrical resistance between the first and second current probes; (C) comparing the resistance value measured in step (B) to a plurality of predefined values; and (D) selecting the predefined value closest to the resistance value measured in step (B). The method may also include the further steps of: (E) converting the value selected in step (D) into a unit associated with quantifying the incline of a surface; and (F) displaying visible indicia representing the unit converted in step (E). Step (F) of the method may further include the steps of: (G) sensing the intensity of the ambient light surrounding the level; (H) subtracting the sensed intensity from a preselected value; and (I) adjusting the intensity of the indicia displayed in step (F) as a function of the result of the step (H).

According to a third aspect of the invention, there is provided an electronically operated level for measuring the incline of a surface. This level comprises: means for sensing the incline of the surface, including a hermetically sealed bladder partially filled with an electrically conductive liquid and partially filled with a gas, wherein the bladder has one raised portion where the gas will collect and one lower portion where the liquid will settle, and wherein the liquid is free to align itself in relation to the incline; first and second probe means coupled to the sensing means for directing an electric current through the electrically conductive liquid wherein a portion of the first and second probe means protrudes through the hermetically sealed bladder, and in one orientation of the bladder, the first probe only contacts the liquid and the second probe only contacts the gas, and wherein the second probe is oriented such that a portion of the second probe contacting only the gas in one orientation of the bladder is increasingly contacted by the liquid as the bladder is rotated on at least one axis; means associated with the first an second probe means for measuring the electrical resistance of the electronically conductive liquid disposed between the first and second probe means; and means coupled to the resistance measuring means for indicating the incline of the surface, wherein the electrical resistance of the liquid between the first and second probe means is related to the incline of the surface.

The sensing means may also include a first and second sensing means, the first sensing means being used to sense the incline of a surface which is generally horizontal, and the second sensing means being used to sense the incline of a surface which is generally vertical. The sensing means preferably includes an automatic switch means for enabling the first sensing means when the level is generally horizontal and for enabling the second sensing means which the level is generally vertical. Preferably, the indicating means includes a light-emitting means for visually indicating the incline of the surface and means for automatically raising and lowering the intensity of the light-emitting means as a function of the ambient light surrounding the level.

The level preferably includes a DC power source, and the measuring means preferably includes a driver circuit means coupled to the indicating means, null detector circuit means coupled to the sensing means and time-out circuit means. The time-out circuit means is coupled to the driver circuit means and the null detector circuit means and substantially reduces the electrical power consumed by the driver circuit means and the null detector circuit means after the expiration of a predetermined time period, thereby reducing the power drawn from the DC power source when the level is not in use or is inadvertently left switched on. The measuring means preferably includes an error-indicating circuit means to indicate when the level is not in a generally horizontal or vertical orientation.

These and other aspects, features, objects and advantages of the present invention may be better understood by reading the detailed description presented below in conjunction with the attached drawings and appended claims.

BRIEF DESCRIPTION OF THE DRAWINGS

The drawings form an integral part of the description of the preferred embodiments and are to be read in conjunction therewith. Like reference numerals designate like components in the different figures.

DETAILED DESCRIPTION OF THE PREFERRED EMBODIMENTS

Figure 1:
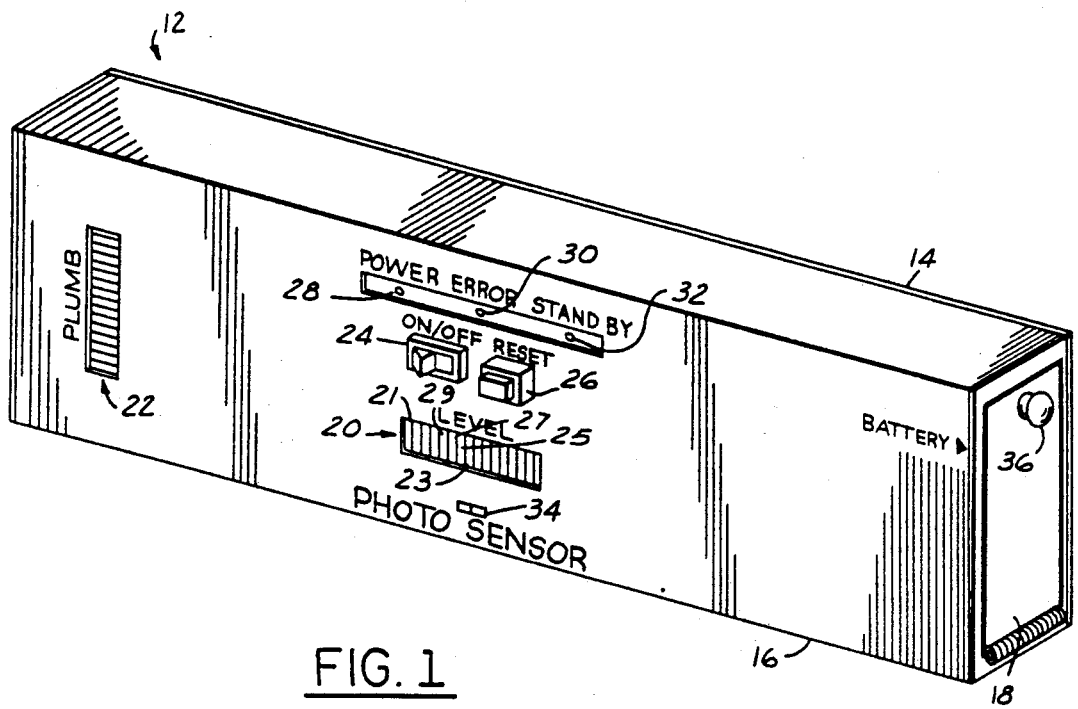
FIG. 1 is a perspective view oft he exterior of the level, as viewed from the front face.

Now referring to FIG. 1, there is shown a level 12 having a generally rectangular housing 14 including at least one flat surface 16 which is the primary surface to which all measurements made by the level 12 will be referenced. The internal battery which powers the level 12 is accessible through battery access door 18. This door 18 is opened and closed by applying a pulling force to battery door access knob 36. Housing 14 can be made from many different materials, preferably a durable material such as plastic, vinyl, wood or some combination thereof.

To activate the level 12, the on-off switch 24 is placed in the on position. The power light 28 will glow when the switch 24 is in the on position and the batteries are charged. The level indicator 20 is constructed from a plurality of light-emitting diodes 21. Each one of these diodes is typically rectangular so that they can be easily stacked together to form the level indicator 20. Light-emitting diode 23 forms the center diode of the level indicator 20. When the center diode is illuminated, this indicates that the flat surface 16 of level 12 is substantially horizontal. If the level 12 is rotated clockwise from a substantially horizontal position, the central diode 23 will cease to glow, and diode 25 will be illuminated. This indicates that the level is tipped at a slight negative incline. If the level 12 continues to e rotated in a clockwise position, diode 27 will be illuminated along with diode 25, and if the level 12 is further rotated in a clockwise position, diode 29 will be illuminated along with diodes 27 and 25. This process will continue until all of the diodes to the left of center diode 23 are illuminated. Likewise, if the level is rotated in a counterclockwise position, the diode to the right of center diode 23 will be illuminated starting from the diode to the right of center diode 23 out to the furthermost right diode.

The plumb indicator 22 operates in the same way as the level indicator 20. The plumb indicator 22 is used when the flat surface 16 of level 12 is oriented in a generally vertical position.

Error indicator lamp 30 will glow if level 12 is not oriented in a position consistent with measuring a horizontal or vertical slope along side 16. Standby indicator 32 will flash on and off if the on/off switch 24 has been left on for more than a predetermined period of time, such as for example forty seconds. When standby indicator 32 is flashing, this indicates that the electronic circuitry used within housing 14 is placed into a reduced power mode. In the reduced power mode, the electronic circuitry found within level 12 is not allowed to draw as much currents it normally would. This reduction in current extends battery life. Reset switch 26 is provided to deactivate the standby mode. By depressing reset 26, the level 12 is taken out of the standby mode and placed in the operating mode where it can be used to indicate level or plumb. In a alternative embodiment, reset switch 26 is automatically activated whenever level 12 is moved. One method of performing this automatic reset function is to employ an accelerometer capable of measuring acceleration in any direction. Signal-conditioning means can be used for amplifying, or providing other necessary signal conditioning for, the output signal produced by the accelerometer. The amplifier output could then be used to drive a relay, or other suitable switching means, which in turn provides the reset function of rest switch 26. An automatic rest function as herein described utilizing an accelerometer, signal-conditioning and switching means is well known to those skilled in the art and, accordingly, is not illustrated in the drawings.

Photosensor 34 is provided for sensing the ambient light in the immediate proximity of level 12. Photosensor 34 is connected to appropriate circuitry which controls the brightness level of the individual light-emitting diodes 21 on the level indicator 20 and the plumb indicator 22. By controlling the intensity of the level and plumb indicators, battery power can be conserved without sacrificing viewability, inasmuch as the brightness of the light-emitting diode which makes up the indicators can be reduced under low-light conditions. The brightness level of indicators 20, 22 is increased during high ambient light conditions so that they remain easily viewable. Smoked glass or a light filter may be placed over indicators 20, 22 to reduce glare, thereby making them easier to read.

The level indicators 20, 22 may be easily calibrated so that for every illuminate light-emitting diode one degree of slope is indicated. Other schemes could also be incorporated whereby the level indicator 20 and plumb indicator 22 are not comprised of individual light-emitting diodes, but rather are comprised of numerical indicia which read out slope in any convenient unit such as degrees of slope, percent of slope, inches per foot, or some simulation of a conventional bubble display.

Figure 2:
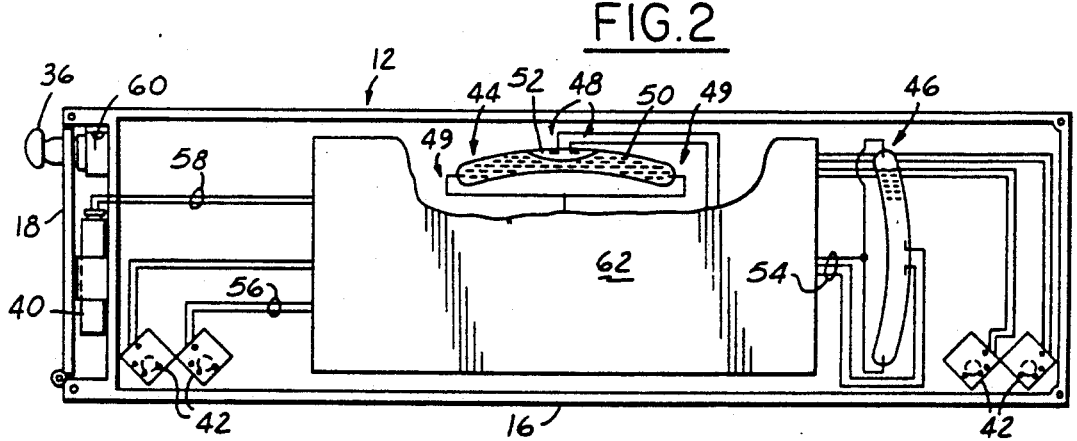
FIG. 2 is a plan view of the back of the level as it is seen if the back face plate is removed.

Reference is now made to FIG. 2 which shows a rear view of level 12 and the relative location of the internal components of the level 12. In the disclosed embodiment, a magnetic catch 60 positively engages battery access door 18 and causes it to maintain a closed position until sufficient force is applied to battery door access knob 36. Battery 40 is placed inside the level 12 directly behind battery access door 18 for easy accessibility. Circuit board 62 houses the level-sensing circuit (not shown) and is fixed within level 12 so that it is easily accessible for maintenance purposes. Circuit board 62 is fed with a number of signals which are brought to it through a number of electrical cables. One such cable is wire cable 56 which connects the electrical signals for gravity-sensing switch 42 to the level-sensing circuit. Another cable, battery electrical cable 58, connects the battery 40 to the circuit board 62. A plurality of other cables are shown running between the gravity-sensing switches 42 and the circuit board 62. The gravity-sensing switches 42 will be described at a later time in connection with FIG. 4; however, it is important to note that they provide the signal to level-sensing circuit 64 which allows the level 12 to determine which indicator (level indicator 20 or plumb indicator 22) it will use.

Two hermetically sealed bladders 44, 46 are shown. Hermetically sealed bladder 44 is used to indicate slope when level 112 is in a generally horizontal position. Hermetically sealed bladder 46 is used when level 12 is in a generally vertical position. A plurality of wires 54 take the signals from hermetically sealed bladder 46 and deliver them to level-sensing circuit 64 (not shown).

Hermetically sealed bladder 44 is identically to the construction of hermetically sealed bladder 46. The only difference between the two bladders 44, 46 is found in their orientation. Because hermetically sealed bladder 44 is used to measure the slope of an incline which is generally horizontal, hermetically sealed bladder 44 is oriented so that the gas bubble 52 found within bladder 44 is centered between upper electric probes 48 when surface 16 of level 12 is generally horizontal. Hermetically sealed bladders 44, 46 both contain an electrically conductive liquid 50. The electrically conductive liquid is ideally one which will not freeze under ordinary outdoor conditions. Many liquids were tried, some of which were mercury, water, water mixed with copper II sulfate, isopropyl alcohol and alcohol with sodium iodide. Mercury proved to be insensitive to minute changes in slope, while some of the other above-mentioned liquids possessed undesirable electrical resistance characteristics. Isopropyl alcohol proved to be the preferred liquid since it is electrically conductive, it does not freeze under normal ambient conditions, and it is inexpensive and readily available. Gas bubble 52 may be comprised of any number of gases, the principal determinations being that it will not be dissolved into the electrically conductive liquid 50, will not corrode any material it contacts and is stable over time. In its preferred embodiment, the gas was ambient air. The operation of hermetically sealed bladders 44, 46 forms an important aspect of this invention, and their operation can be better understood by referring to FIG. 3.

Figure 3A:
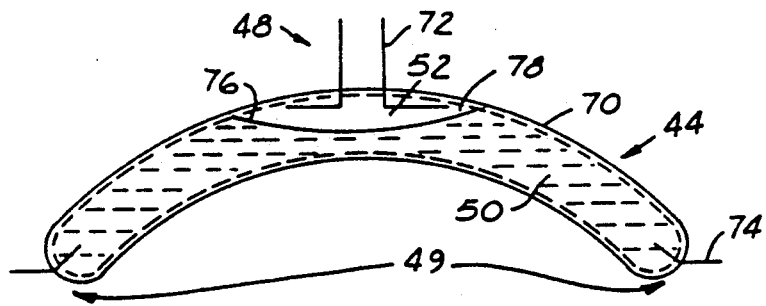
FIGS. 3A-3D are illustrations of the hermetically sealed bladder partially filled with liquid and partially filled with air.

FIGS. 3A-D will be used to explain the construction and operation of hermetically sealed bladders 44, 46. FIG. 3A shows hermetically sealed bladder 44 comprising a hermetically sealed bladder housing 70 partially filled with an electrically conductive liquid 50 and partially filled with a gas 52. Protruding through the bladder housing 70 are two upper electric probes 48 and two lower electric probes 49. In one orientation of bladder housing 70, the position of electrically conductive liquid 50 to that of gas 52 in housing 70 i such that the two upper electric probes 48 contact only gas 52 and do not contact electrically conductive liquid 50. In this orientation, there remains a slight gap 78 between upper probe 72 and the gas/liquid dividing line 76. Because gap 78 exists, there is a relatively high electrical resistance between probe 72 and probe 74. This relatively high electrical resistance is unique to this orientation of the bladder housing.

Figure 3B:
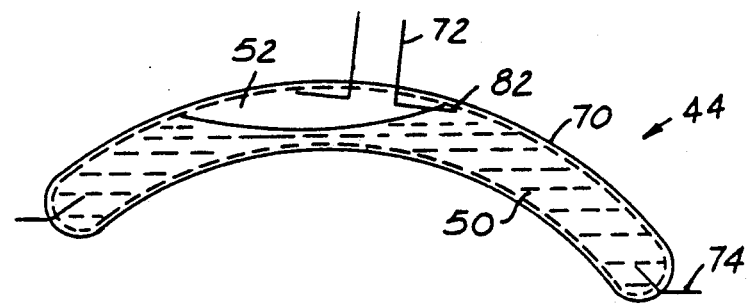

Reference is now made to FIG. 3B, which shows the position of gas bubble 52 when bladder housing 50 is tipped slightly. Once the bladder housing 70 is taken out of its purely horizontal orientation (as shown in FIG. 3A) and placed at an angle, upper electrical probe 72 will contact electrically conductive liquid 50 at its outermost end portion 82. Once contact is made between upper electrical probe 72 and electrically conductive liquid 50, the resistance between probes 72 and 74 will be much less than it is in the configuration shown in FIG. 3A. This is true provided that the electrical conductivity of liquid 50 is greater than the electrical conductivity of gas 52 (which is the case for the majority of gas/liquid combinations). Upon first contact between probe 72 and electrically conductive liquid 50, a unique resistance value appears between probes 72 nd 74. Once the electric resistivity of the electrically conductive liquid 50 is determined, there exists fixed relationship between the resistance between probes 72 and 74 and the angle of slope of bladder housing.

Figure 3C:
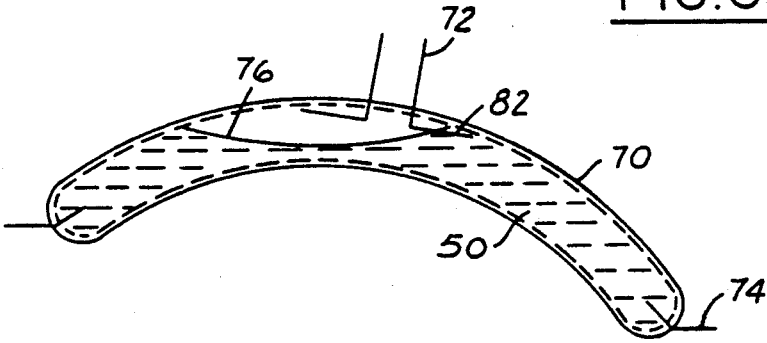
Figure 3D:
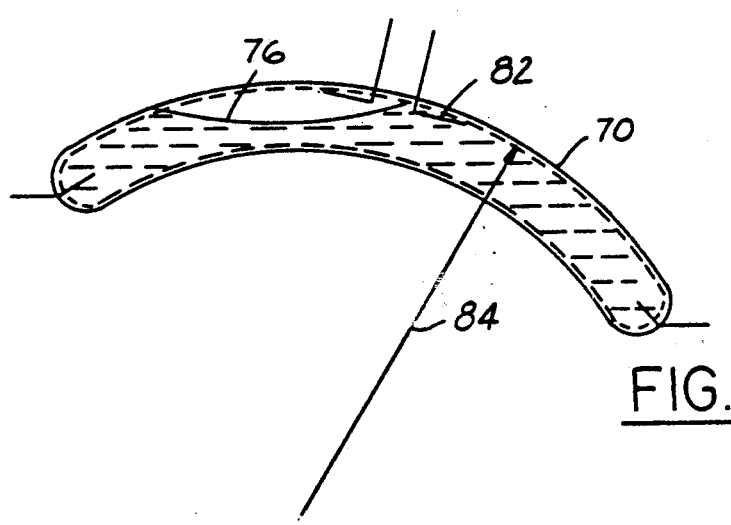

As bladder housing 70 is rotated to a further clockwise position, as shown in FIG. 3C, gas liquid dividing line 76 continues to move across probe 72, thereby immersing more of the probe end 82 within the electrically conductive liquid 50. For each unique position which the gas/liquid dividing line 76 can cross upper electrical probe 72, there is formed a unique resistance value between probes 72 and 74. Because of the position of the orientation of bladder housing 70, it can be seen by those skilled in the art that hermetically sealed bladder 44 forms a transducer which transformers the slope of a surface into a resistance value. As the bladder housing 70 is further rotated in a clockwise position, FIG. 3D shows that there will be a point at which the gas/liquid dividing line 76 will no longer cut across probe 72 upon further rotation of bladder housing 70.

In calibrating the housing 70, its sensitivity can be increased by increasing the radius of the arc shown at 84. By increasing this radius of arc 84, the gas/liquid dividing line 76 will travel further across the surface of the bladder housing 70 for equal angular increments. To increase the sensing range of the transducer, the portion of upper electric probes 48 which are found inside the bladder housing can be made longer in a horizontal direction as viewed in FIGS. 3A to 3D. This gives the gas/liquid dividing line a much longer length to cut across, and accordingly a wider range of angle measurement could be made.

Figure 4:
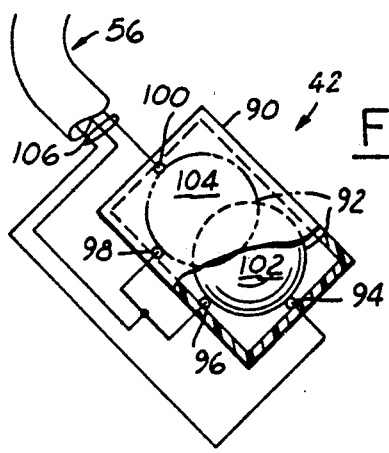
FIG. 4 is a front cutaway view of a gravity-sensing switch.

Reference is now made to FIG. 4 which shows the details of one of a plurality of gravity-sensing switches 42 which are used in level 12. The gravity-sensing switches 42 are comprised of a housing 90 which contains a switch ball 92. Switch ball 92 can take one of two possible positions within housing 90 under normal operating conditions of level 12. When level 12 issued to measure a generally horizontal slope, switch ball 92 will travel to position 102. In position 102, switch ball 92 acts as an electrical conductor between contact 94 and 96. In order to provide a current path between contact 94 and contact 96, switch ball 92 must be made of an electrically conductive material or at least have an electrically conductive surface. When flat surface 16 of level 12 is placed against a substantially vertical surface, switch ball 92 will travel within housing 90 and settle into position 104. There it will provide an electrical path between contact 98 and contact 100.

From the movement of switch ball 92 within gravity-sensing switch 42, it can be seen that the level-sensing circuit (not shown) can determine at any time which position the level is generally in (generally horizontal or generally vertical). This information is used by the level-sensing circuit to determine which hermetically sealed bladder to use (44 or 46) and which indicator to use (level indicator 20 or plumb indicator 22). Individual wires 106 carry the electrical currents which flow through switch ball 92 to a level-sensing circuit (not shown) through cable 56.

Figure 5:
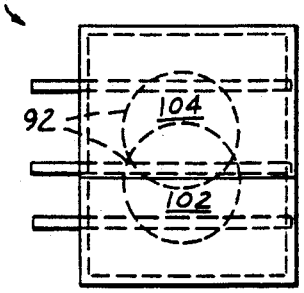
FIG. 5 is a side view of a gravity-sensing switch.

FIG. 5 shows a side view of gravity-sensing switch 42 with hidden lines indicating the rest position of switch ball 92 when level 12 is in a generally horizontal position 102 and vertical position 104.

Figure 6:
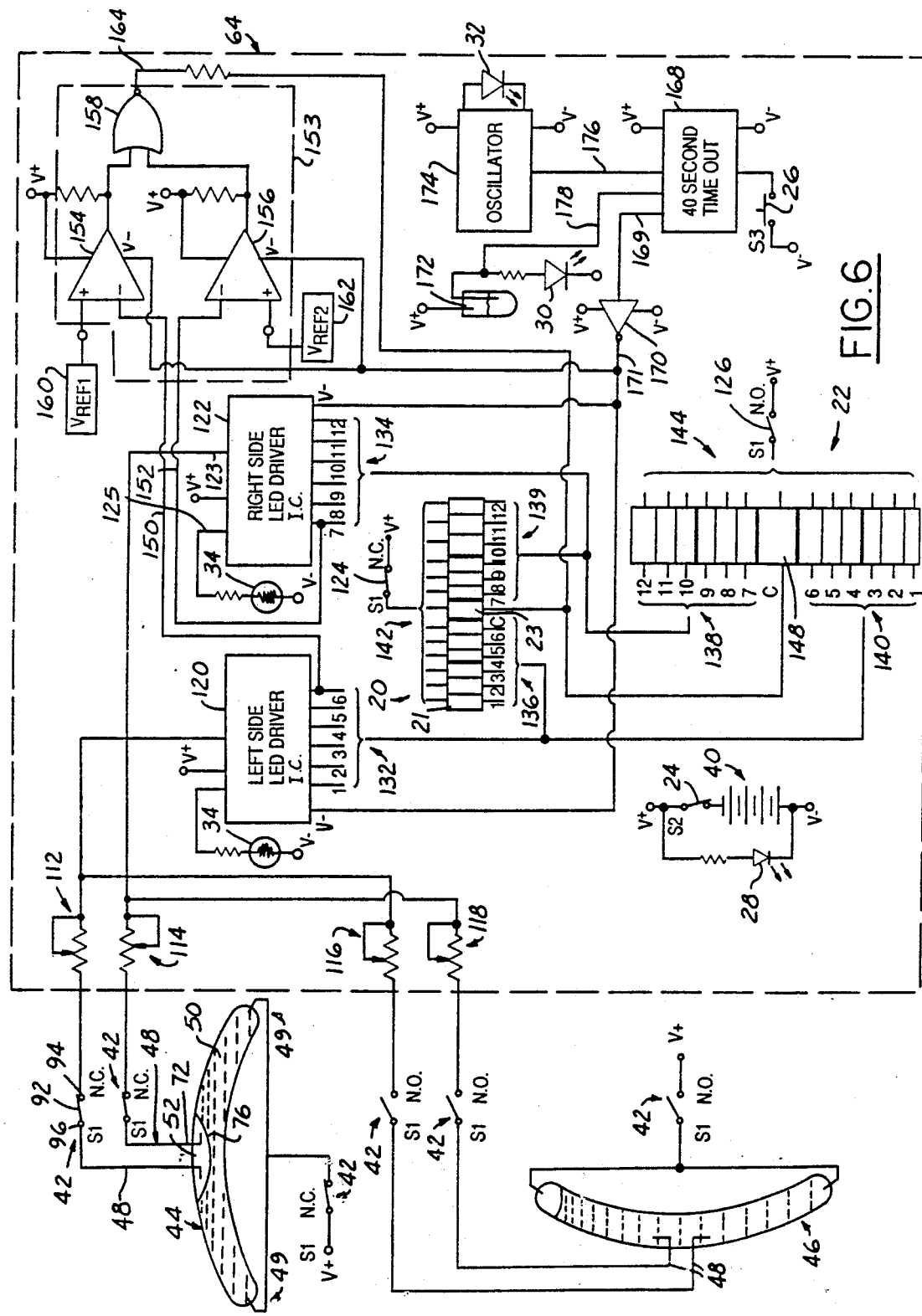
FIG. 6 is a combined block and schematic diagram of the electronic circuitry employed within the level.

Now referring to FIG. 6, level-sensing circuit 64 is shown for converting the signal derived from hermetically sealed bladder 44, 46 into level-indicating indicia on indicators 20, 22. The operation of level-sensing circuit will now be discussed as it relates to hermetically sealed bladder 44 and level indicator 20. Hermetically sealed bladder 46 and plumb indicator 22 need not be described in detail inasmuch as the discussion of hermetically sealed bladder 44 and level indicator 20 is directly applicable to bladder 46 and indicator 22.

Upper electrical probes 48 of hermetically sealed bladder 44 are shown connected through contacts of gravity-sensing switch 42 to potentiometers 112 and 114. Lower electric probes 49 are tied through one of the gravity-sensing switches 42 to the positive side of the battery 40. Although he vertical use of the level is identical to the horizontal use of the level and will not be discussed herein, it is important to note that when the level is in a generally horizontal position as depicted in FIG. 6, gravity-sensing switches 42 associated with hermetically sealed bladder 46 are in a normally open position. This prevents any signals which are present on the upper electric probes 48 of hermetically sealed bladder 46 from interfering with the signals derived from the upper electric probes 48 of hermetically sealed bladder 44. Potentiometers 112, 114 provide a means for limiting the current which flows through the upper electric probes 48 of hermetically sealed bladder 44. This adjustability allows many different bladder designs having various electrical characteristics to all employ the same LED driver circuit. Likewise, potentiometers 116, 118 provide a means for limiting the current which flows through upper electric probes 48 of hermetically sealed bladder 46.

When hermetically sealed bladder 44 is rotated in a clockwise position, the gas bubble 52 will being to move towards the left end of hermetically sealed bladder 44. As gas bubble 52 moves, gas/liquid dividing line 76 will contact upper electric probe 72. This contact between probe 72 and electrically conductive liquid 50 will provide a current path from the positive side of battery 40 through the first gravity-sensing switch 42, electrically conductive liquid 50, upper electric probe 72, second gravity-sensing switch 42, potentiometer 114 and to the right side LED driver 122. The right side LED driver 122 is a "voltage level indicator" integrated circuit known to those skilled in the electronics art. In the prototype mock-up of this level, chip number LM3915N was utilized. Integrated circuit 122 simply takes the voltage signal provided at its input 123 and enables one or more of its outputs 134, thereby driving one or more of the light-emitting diodes 139. IC 122 is of the open collector variety, thereby sinking current through gravity-sensing switch 124 and one or more of the light-emitting diodes 139 to the negative side of the battery (through IC 170).

One of two photosensors 34 is connected to an input pin of IC 122. Integrated circuit 122 is designed to modify the current which is delivered through light-emitting diodes 139 as a function of the voltage supplied to its sensing pin 125. In low-light conditions, light-emitting diodes 139 do not need to be as bright as they would be under high-light conditions. By modifying the current through the bank of light-emitting diodes 139, unnecessary battery drainage is minimized, thereby increasing battery life.

As can be seen if FIG. 6, right side LD driver 122 drives the six light-emitting diodes 139 which are disposed to the right of the center diode 23 of level indicator 20. Left side LED drive 120 drives the six light-emitting diodes 136 which are disposed to the left of the center diode 23 of level indicator 20. Center diode 23 is to driven by either IC 120 or IC 122, but rather is driven by the output of logic circuit 153.

Lines 150, 152 are used to sense the drive signals which are connected to the two light-emitting diodes which flank the center diode 23 in level indicator 20. When the voltage levels on lines 150, 152 are both low, this indicates that upper electrical probes 48 are contacting only the gas bubble 52 and are making no contact with electrically conductive liquid 50. Under this condition, hermetically sealed bladder 44 is in a near perfectly horizontal position, and the logic employed by logic circuit 153 will case center LED 23 to illuminate. If either one of the light-emitting diodes which immediately flank the center diode 23 are illuminated, this indicates that the hermetically sealed bladder 44 is not in a near perfectly horizontal orientation, and accordingly the center LED will not be illuminated. This is accommodated by logic circuit 153 by virtue of exclusive OR gate 158.

If either one of the inputs to exclusive OR gate 158 is high, its output will be high, but since its output is negated, the signal at 164 will be low. Comparators 154, 156 do not change the fundamental logic operation of logic circuit 153; they merely act to establish a voltage reference threshold 160, 162 such that below the threshold no logic changes will be made by logic circuit 153. Comparators 154, 156 simply act to prevent any spurious noise or any current leakage from triggering the output 164 of logic circuit 153.

Plumb indicator 22 operates in the same manner as level indicator 20. It is oriented on level 12 such that it can be easily read when side 16 of level 12 is in a generally vertical position. Plumb indicator 22 is automatically switched into and out of the left side drive IC 120 and the right side driver IC 122 by virtue of gravity-sensing switch 126. When level 12 is placed in a generally vertical position, gravity-sensing switch 126 will close, and gravity-sensing switch 124 will open. Plumb indicator 22 is constructed from the same number of light-emitting diodes as level indicator 20. This consists of six light-emitting diodes 138 disposed above sensor light-emitting diode 148, and six light-emitting diodes 140 are disposed below sensor light-emitting diode 148. The output of these thirteen light-emitting diodes is tied together and routed through gravity-sensing switch 126 to the positive side of the battery 40.

In the prototype of the present invention, the sensor diode was made green in color. The three diodes above the sensor diode and the three diodes below the sensor diode were yellow in color. The six remaining diodes were red. This contrast in color made it easy for an operator to quickly determine if the slope he was measuring was perfectly plumb, slightly deviating from plumb or radically deviating from plumb.

Forty-second time-out circuit 168 was constructed by a standard 555 low-current drain timer chip (CMOS LM555C). This timer circuit 168 causes its output line 169 to go high every forty seconds. This signal is then inverted by inverter 170 which causes its open collector output 171 to go into a high impedance state. When this output 171 goes into a high impedance state, only a minimal amount of current will flow through IC 120, 122, comparator 154, and comparator 156 inasmuch as the V-pins of these chips are connected to inverter 170 at its open collector output 171. This effectively shuts down these circuit elements and does not allow them to operate, thereby conserving battery power. Once switch 26 is momentarily depressed, time-out circuit 168 is reset, and operating power is restored to IC 120, 122 and comparator 154, 156. As heretofore described, switch 26 does not necessarily have to be of the manually activated kind. Switch 26 can be automatically activated by using an accelerometer to sense motion in level 12. Whenever level 12 moves, an accelerometer can be employed to detect this movement and register an output signal. This signal can then be amplified and sent to a relay or other appropriate switching device which can perform the rest function. The automatic rest feature is attractive because it eliminates one switch from the face of the level and, moreover, it eliminates a potential nuisance for the user. After the level is reset, either by manual or automatic means, the level may be used for approximately forty seconds before the next time-out sequence occurs.

The error mode circuit of level 12 employs a liquid mercury switch 172 which senses the orientation of the level and causes line 169 to go high (indicating an error conditions exists) whenever the level is in an orientation which is inconsistent with its ability to measure horizontal or vertical slope. This inconsistency occurs whenever level 12 is oriented such that neither bladder 44, 46 has its center arch portion raised above the remainder of the bladder. The error mode circuit is considered to be an important aspect of the present invention because, when activated, it warns the user that the indications presented on level indicator 20 and plumb indicator 22 are probably erroneous. Without an error mode, it would be possible for a user to use the level improperly and not be aware of the erroneous indications furnished by the level. Whenever switch 172 pulls line 178 high, it also causes error indicator lamp 30 to glow.

Oscillator 174 is constructed from a standard integrated circuit such as integrated circuit LM3909N. Oscillator circuit 174 simply operates in response to an enabling signal on line 176 to flash off and on the standby indicator 32. Whenever the liquid mercury error switch 172 causes error indicator to glow, this event is sensed by the forty-second time-out circuit along line 178. Whenever line 178 goes high, forty-second time-out circuit 168 immediately times out, regardless of where it is in its time-out cycle, thereby enabling oscillator 174 to flash standby indicator 32 and enabling inverter 170, thereby placing IC 120, 122 and comparator 154, 156 in their low-power consumption mode as previously explained.

Power indicator 28 will glow whenever on/off switch 24 is engaged in the on position. Switch 24 acts as the main power switch enabling current to flow to the necessary components in the level-sensing circuit 64.

From the foregoing, it is apparent that the method and apparatus of the present invention provide for the reliable accomplishment of the objects of the invention and do so in an economical manner. It is recognized, of course, that those skilled in the art may make various modifications or additions to the preferred embodiments chosen to illustrate the invention without departing from the spirit and scope of the present invention. For example, the disclosed invention may be easily modified so that the read-out indicia does not consist of a number of individual light-emitting diodes, but rather one which uses a numerical indicia to indicate slope. Accordingly, it is to be understood that the protection to be afforded hereby should be deemed to extend to the subject matter claimed and all equivalents thereof fairly within the scope of the invention.

I claim:

1. An electronically operated level for measuring an incline of a surface, comprising:

means partially filled with an electrically conductive liquid for sensing the incline of said surface, wherein said liquid is free to align itself in relation to said incline;

first and second probe means coupled to said sensing means for directing an electric current through said electrically conductive liquid;

means associated with said first and second probe means for measuring an electrical resistance of said electrically conductive liquid disposed between said first and second probe means;

means coupled to said resistance measuring means for indicating the incline of said surface, wherein said electrical resistance of said liquid between said first and second probe means is related to the incline of said surface;

wherein said sensing means includes a first and a second sensing means, said first sensing means being used to sense the incline of a surface which is generally horizontal, and said second sensing means being used to sense the incline of a surface which is generally vertical;

wherein said sensing means includes automatic switch means for enabling said first sensing means when said level is generally horizontal, and for enabling said second sensing means when said level is generally vertical;

wherein said indicating means includes light emitting means for visually indicating the incline of said surface and means for automatically raising and lowering an intensity of said light emitting means as a function of an ambient light surrounding said level;

wherein said electronically operated level includes a DC power source and wherein said measuring means includes a driver circuit means coupled to said indicating means, a null detector circuit means coupled to said sensing means and a time-out circuit means, wherein said time-out circuit means is coupled to said driver circuit means and said null detector circuit means and substantially reduces the DC power consumed by said driver circuit means and said null detector circuit means after the expiration of a predetermined time period, thereby reducing the power drawn from said DC power source when said level is not in use or is inadvertently left switched on;

wherein said electronically operated level includes error indicating circuit means to indicate when said level is in an orientation which is inconsistent with said sensing means' ability to sense the incline of a surface; and wherein said error indicating circuit means includes a switch which is responsive to the orientation of the electronically operated level, said switch indicating an error condition when said level is in an orientation which is inconsistent with said sensing means' ability to sense the incline of a surface, and wherein said error indicating circuit means is coupled to an error light for activating said error light when an error condition exists and wherein said error indicating circuit means is coupled to said time out circuit for activating said time out circuit independent of any predetermined time period, and wherein said level includes reset means coupled to said time-out circuit means for resetting said time-out circuit means.

2. The apparatus of claim 1, wherein said light emitting means further includes first and second light means, said first light means activated by said automatic switch means for indicating the incline of said surface when said surface is generally horizontal and said second light mean activated by said automatic switch means for indicating the incline of said surface when said surface is generally vertical.

* * * * *